United States Patent [19]

Roe et al.

[11] Patent Number: 4,882,120
[45] Date of Patent: Nov. 21, 1989

[54] DC CONTENT CONTROL FOR AN INVERTER

[75] Inventors: Derrick I. Roe, Rockford, Ill.; Christopher J. Rozman, Delavan, Wis.; Bradley J. Recker, Rockford, Ill.

[73] Assignee: Sundstrand Corporation, Rockford, Ill.

[21] Appl. No.: 285,119

[22] Filed: Dec. 16, 1988

[51] Int. Cl.$^4$ .................. H02P 13/18; H02M 5/458
[52] U.S. Cl. ........................... 363/98; 363/37; 363/41
[58] Field of Search .............. 363/37, 41, 97, 98, 363/131, 132

[56] References Cited

U.S. PATENT DOCUMENTS

| | | | |
|---|---|---|---|
| 4,617,622 | 10/1986 | Fox | 363/98 |
| 4,621,316 | 11/1986 | Uesugi | 363/98 |
| 4,635,177 | 1/1987 | Shekhawat et al. | 363/41 |
| 4,729,082 | 3/1988 | Sato | 363/41 |

Primary Examiner—Peter S. Wong

[57] ABSTRACT

Power inverters for converting DC power into AC power often produce a DC component in the inverter output which is objectionable. In order to overcome this problem, an inverter control according to the present invention detects the magnitude of the DC component in the inverter AC output power and adjusts the time of selected rising and falling edges of control waveforms for switches in the inverter to reduce the magnitude of the DC component.

7 Claims, 8 Drawing Sheets

DC CONTENT CONTROL FOR AN INVERTER

TECHNICAL FIELD

The present invention relates generally to inverter controls, and more particularly to a control which controls DC content in the output of an inverter.

BACKGROUND ART

Power inverters have long been used to convert DC power into AC power for energizing one or more AC loads. Typically, such inverters include switches such as transistors which are operated by a control in a pulse width modulated (PWM) mode to produce a PWM waveform comprising a series of pulses and notches. The waveform is converted into a sinusoidal output waveform by a filter which is coupled to the inverter output. Such an inverter may be used as part of a variable speed constant frequency (VSCF) power generating system in which a generator is driven by a variable speed prime mover to produce variable frequency AC power which is rectified, filtered and applied to the inverter as DC power over a DC link.

Ideally, the control should operate the inverter switches so that no DC power is produced in the output. However, operating conditions may cause DC content to be produced in the output of the inverter. This DC content can lead to undesirable consequences when the loads supplied by the inverter cannot tolerate same.

Sato U.S. Pat. No. 4,729,082 discloses a control for a power converter which converts between AC and DC power in a bidirectional manner. In order to eliminate the DC component of current on the AC side of the power converter, the control operates the converter to produce a DC voltage on the AC side which opposes the direct current component. The DC voltage is produced in one embodiment by shifting a half-cycle of the AC output waveform by a phase displacement which causes a DC component to be produced in the phase output. There is no clear description in this patent, however, as to how or by what means this is accomplished.

SUMMARY OF THE INVENTION

In accordance with the present invention, a control for an inverter controls DC content in the inverter output in a simple and effective manner.

More particularly, a control for an inverter which develops AC output power includes means for detecting the magnitude of a DC component in the inverter AC output power and means responsive to the detecting means for adjusting the time of selected rising or falling edges of a control waveform for a switch in the inverter to reduce the magnitude of the DC component.

In the preferred embodiment, the control is particularly adapted for use with a pulse width modulated (PWM) inverter of a VSCF system. Preferably, the rising edges of pulses in at least a portion of a PWM control waveform are delayed when positive DC content is sensed. Conversely, falling edges in at least a portion of a PWM control waveform are delayed when negative DC content is detected in the inverter output.

The control includes edge select and edge delay circuits which determine which pulse edges are to be delayed and by how much. A PWM control waveform is provided to the edge delay circuit which delays the selected edges by an amount dependent upon the magnitude of the DC content in the inverter output. The edge select and edge delay circuits can be adapted to prevent delay of a rising or falling edge beyond a point at which minimum pulse width or dead time requirements imposed by the response times of the switches in the inverter would be violated.

The control of the present invention can be used in conjunction with inverters which develop a rail to rail output and with inverters which develop a rail to neutral output.

The control of the present invention is simple in nature and effectively reduces DC content in the inverter output so that the problems associated therewith are avoided.

DESCRIPTION OF THE PREFERRED EMBODIMENT

Figure 1:
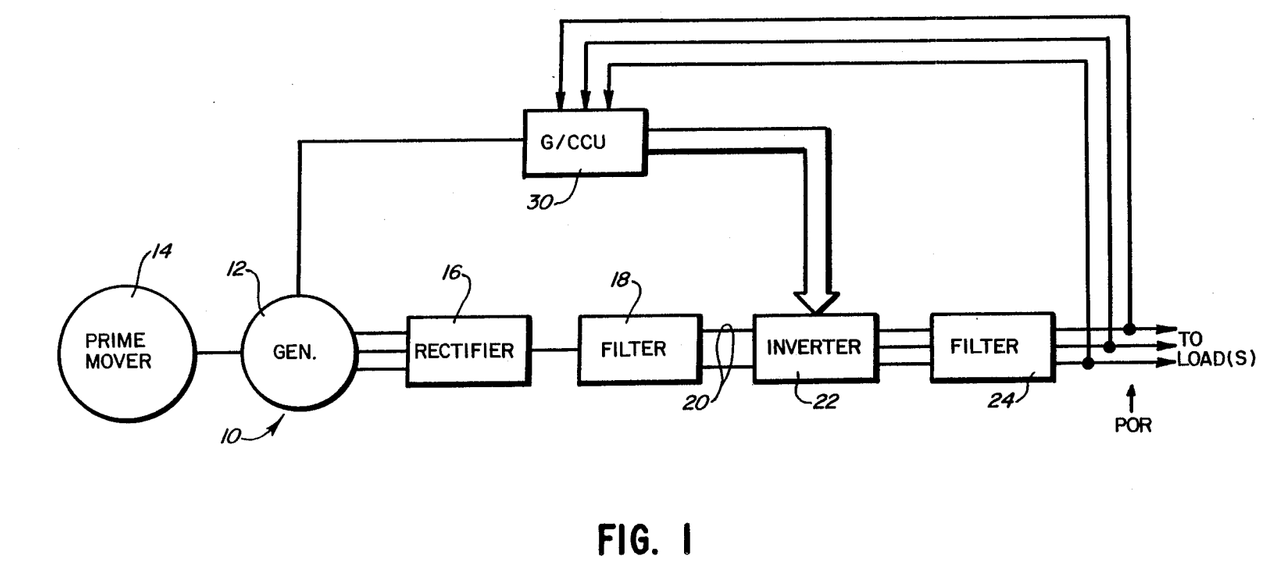
FIG. 1 is block diagram of a VSCF system incorporating the control of the present invention.

Referring now to FIG. 1, a variable speed, constant frequency (VSCF) system 10 is illustrated. The VSCF system 10 includes a brushless, synchronous generator 12 driven by a variable speed prime mover 14 which may be, for example, a jet engine. The generator develops a polyphase, variable frequency AC output which is converted into DC power by a rectifier 16 and a filter 18. The resulting DC power is provided over a DC link 20 to an inverter 22 which converts the DC power into constant frequency AC power. This AC power is filtered by an optional filter 24 and is provided to one or more AC loads.

Figure 2:
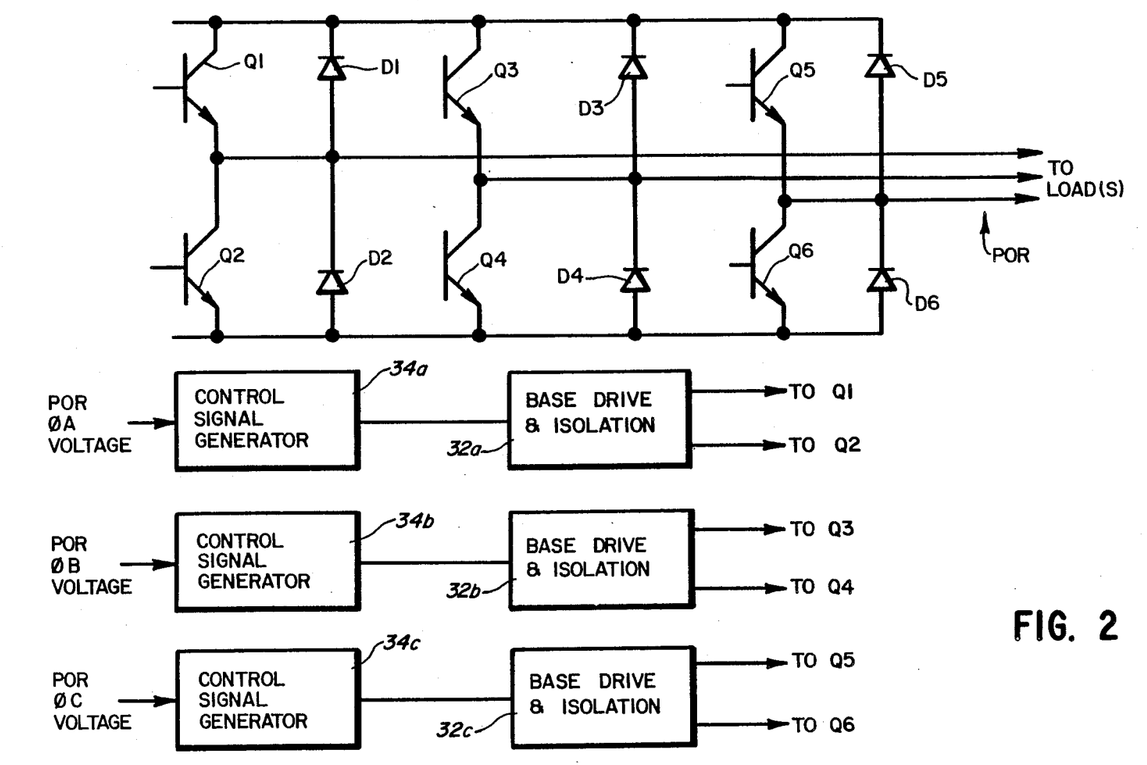
FIG. 2 is a combined schematic and block diagram of the control of the present invention in conjunction with a simplified representation of the inverter shown in FIG. 1.

The inverter 22 includes switches Q1–Q6, shown in FIG. 2, which are controlled by a generator/converter control unit or G/CCU 30. The G/CCU also controls the excitation of the brushless generator 12 in accordance with a parameter of the output power developed at a point of regulation (POR). This function of the G/CCU is not necessary to an understanding of the invention and hence will not be described in greater detail.

Referring specifically to FIG. 2, the switches Q1–Q6 of the inverter 22 are connected in pairs in a conventional three-phase bridge configuration together with associated flyback diodes D1–D6. The switches are controlled by base drive signals developed by base drive and isolation circuits 32a–32c. Each base drive and isolation circuit 32a, 32b or 32c receives a control signal MA, MB or MC, respectively, developed by a control signal generator 34a–34c, respectively. Each control signal generator 34a–34c is in turn responsive to a parameter of the power at the POR, for example phase voltage.

The inverter topology illustrated in FIG. 2 is referred to as a rail to rail topology inasmuch as the switches of each pair are alternately operated so that each phase output is alternately connected to the upper and lower rails. This inverter may be replaced by an inverter of the rail to neutral type (sometimes referred to as a "neutral point clamped" inverter) in which an additional switch is connected between each phase output and a neutral voltage. During a positive half cycle of each phase output, the upper rail switch Q1 or Q3 or Q5 is operated alternately with the corresponding neutral switch while the remaining switch of the pair Q2 or Q4 or Q6 is maintained off. During the negative half cycle of each phase output, the upperrail switches Q1, Q3 and Q5 are maintained in an off condition while the switches Q2, Q4 or Q6 are operated alternately with the associated neutral switches. The phase outputs thus change between the voltage on one of the rails of the DC link 20 and the neutral voltage.

Figure 3:
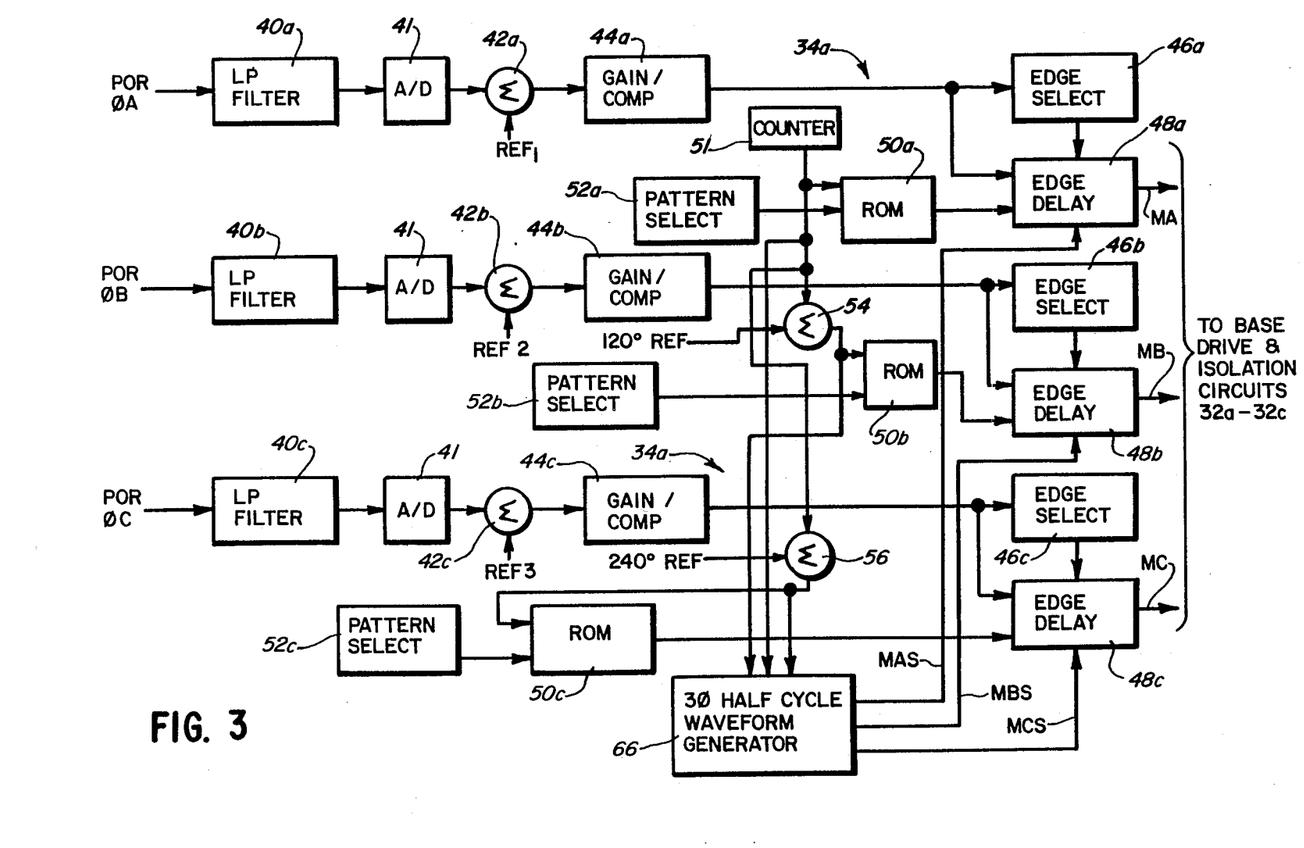
FIG. 3 is a block diagram of one of the control signal generators illustrated in block diagram form in FIG. 2.

FIG. 3 illustrates the control signal generators 34a–34c in greater detail. Each of the POR phase voltages is applied to a fourth order or other low pass filter 40a–40c which develops a signal representing the magnitude and polarity of the DC content in the respective inverter output phase. The signals are processed by an analog to digital (A/D) converter and provided to summers 42a–42c which subtract reference values REF1–REF3 therefrom to produce deviation signals representing the deviation of the DC content magnitude from zero magnitude. The deviation signals are coupled to gain and compensation units 44a–44c each of which develops a digital word having 16 bits ADC0–ADC15 representing the required correction to inverter switching to in turn reduce the DC content to zero. These digital correction words are provided to edge select circuits 46a–46c and edge delay circuits 48a–48c.

The edge delay circuits 48a–48c develop the control signals which are provided to the base drive and isolation circuits 32a–32c. Each edge delay circuit 48a–48c receives a pulse width modulated (PWM) waveform which is retrieved from a memory 50a–50c. Each memory 50a–50c includes high and low order address inputs which receive signals that determine the selection of the particular PWM waveform to be obtained from the memory and the phase and frequency of the retrieved waveform, respectively. The low order address inputs of the memory 50a receive the output of a counter 51 which accumulates clock pulses. The high order address inputs of each of the memories 50a–50c receive signals developed by pattern select circuits 52a–52c which may be responsive to a command signal and one or more sensed output parameters of the inverter. The pattern circuits 52a–52c cause selection of appropriate PWM waveforms from the memories 50a–50c to obtain a desired inverter output condition. The details of the pattern select circuits 52a–52c are unnecessary to an understanding of the present invention and hence will not be described in greater detail.

The counter 51 is coupled to summers 54, 56 which in turn include outputs which are coupled to the low order address inputs of the memories 50b and 50c. The summers 54 and 56 receive reference signals representing 120° and 240° displacements so that the outputs of the memories 50b and 50c are displaced by these amounts from the output of the memory 50a. Again, a detailed understanding of the phase displacement circuitry is not necessary to an understanding of the present invention and hence further description will not be provided herein.

Representative pattern select circuitry for selecting appropriate PWM waveforms from the memories 50a–50c is disclosed and claimed in Recker et al. U.S. Pat. application Ser. No. 07/285,423, filed Dec. 16, 1988 entitled "Low Distortion Control for A VSCF System". Circuitry for maintaining the memory outputs at precise 120° displacements is disclosed and claimed in Rozman et al. U.S. patent application Ser. No. 07/285,118 filed Dec. 16, 1988, entitled "Phase Separation Control", and assigned to the assignee of the instant application. The disclosures of both of the foregoing patent applications are incorporated by reference herein.

As noted in greater detail hereinafter, the edge select circuits 46a–46b determine whether the rising or falling edges of the PWM waveforms are to be delayed and the length of such delay to implement a coarse DC content correction. In addition, the edge select circuits 46a–46c ascertain which pulse edges are to be further delayed by time periods determined by the width of pulses developed by a clock. The edge delay circuits 48a–48c undertake the edge delay function to reduce the DC content in the inverter output.

Figure 4:
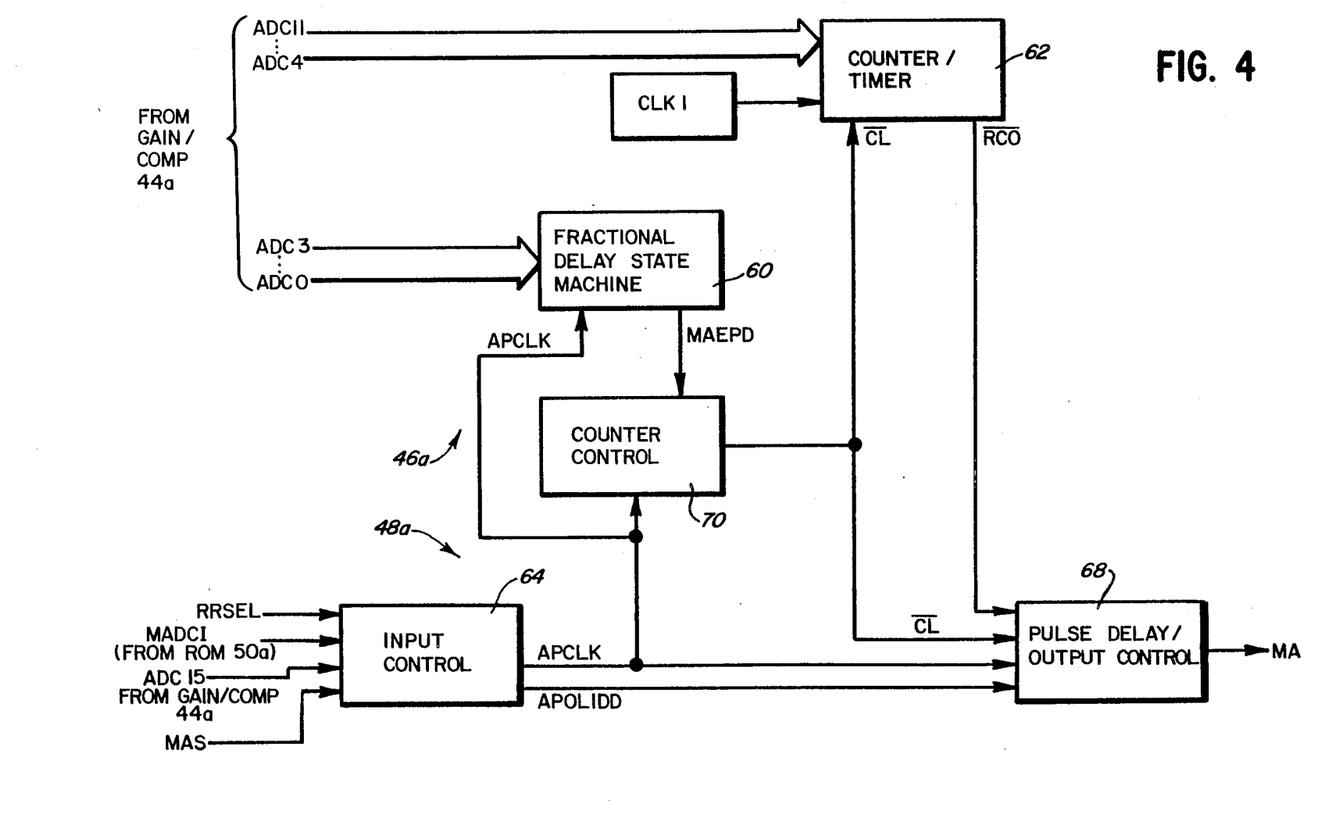
FIG. 4 is block diagram of one of the edge select and edge delay circuits shown in FIG. 3.

Referring now to FIG. 4, there is illustrated in block diagram form the edge select circuit 46a and edge delay circuit 48a. The edge select circuit 46a receives 12 bits ADC0-ADC11 of the digital words developed by the gain and compensation unit 44 representing the required edge delay to correct for DC content in the inverter phase output. The bits ADC0-ADC3 are provided to a fractional delay state machine 60 while the remaining bits ADC4-ADC11 are provided to a counter/timer 62. The sixteenth bit ADC15 representing the polarity of the DC content in the inverter output is provided to an input control 64 together with the bit stream, designated MADCI, obtained from the memory 50a. It should be noted that the bits ADC12-ADC14 are not used although they could be used with the bits ADC0-ADC11 to indicate the required correction with a higher resolution, if desired.

Also provided to the input control 64 is a signal RRSEL which is placed in a high state if the rail to rail converter topology shown in FIG. 2 is utilized or which is placed in a low state when a neutral point clamped inverter topology is used. A signal MAS developed by a three-phase half cycle waveform generator 66, FIG. 3, is also provided to the input control 64. The half cycle waveform MAS is in a high state when phase A of the inverter output is in a first or positive half cycle and is in a low state when the inverter phase A output is in a second or negative half cycle. The three-phase half cycle waveform generator 66 also develops a phase B and phase C half cycle waveforms, designated MBS and MCS, which are identical to the waveform MAS except that they are displaced 120° and 240°, respectively, relative to such waveform.

The input control 64 develops two signals APCLK and APOLIDD which are provided to a pulse delay-/output control 68. The control 68 also receives a signal $\overline{CL}$ developed by a counter control 70 and a counter output signal RCO. The control 69 in turn develops the control signal MA which is provided to the base drive and isolation circuits 32a.

The counter control 70 is responsive to a signal MAEPD developed by the fractional delay state machine 60 and the signal APCLK developed by the input control 64. The signal APCLK is also provided to the fractional delay state machine 60.

The signal $\overline{CL}$ and the bits ADC4-ADC11 together control the amount of delay of the selected pulse edges in the PWM waveform to effect the coarse correction. The signal MAEPD determines which pulse edges are to be additionally delayed by a time equal to the width of pulses developed by a clock CLKI which is coupled to a clock input of the counter/timer 62.

Figure 5:
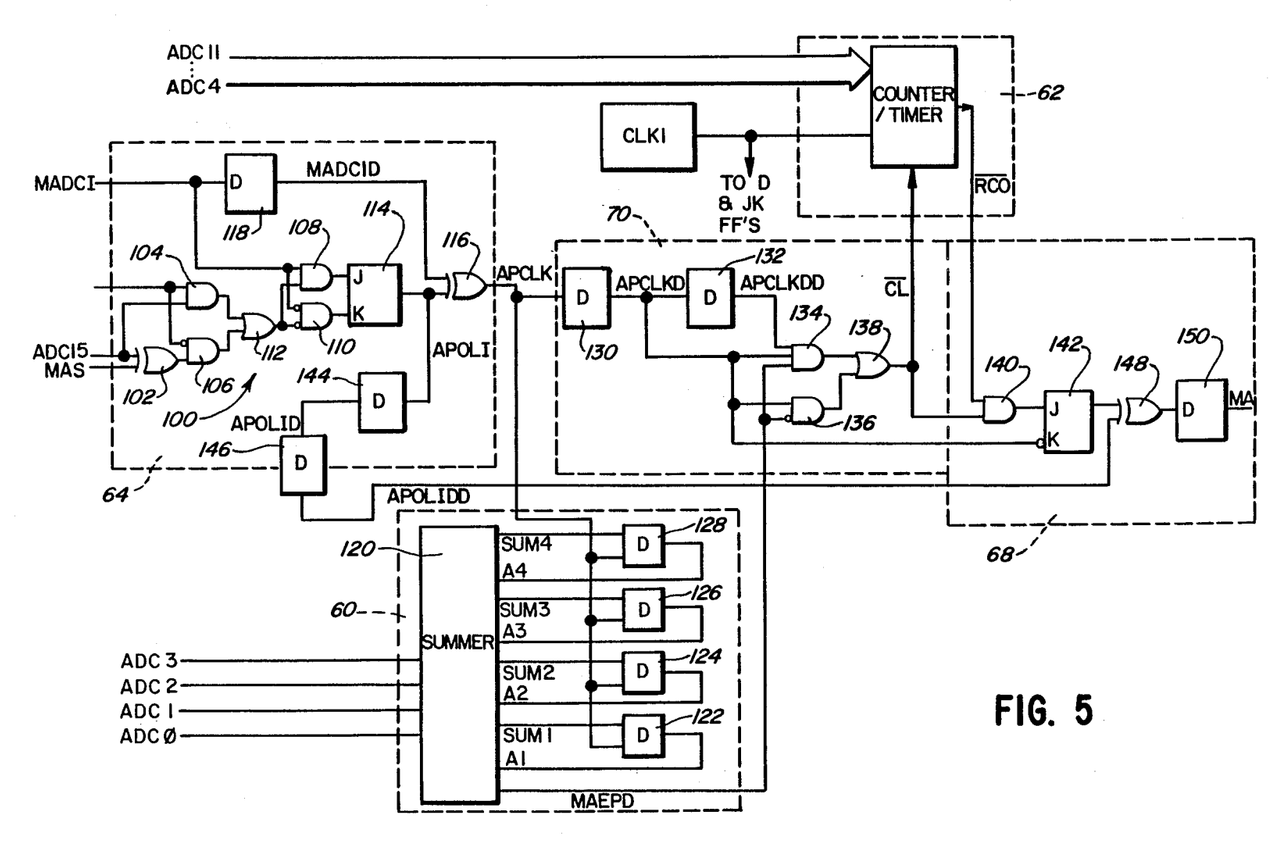
FIG. 5 is a schematic diagram of the edge select and edge delay circuits of FIG. 4.
Figure 6:
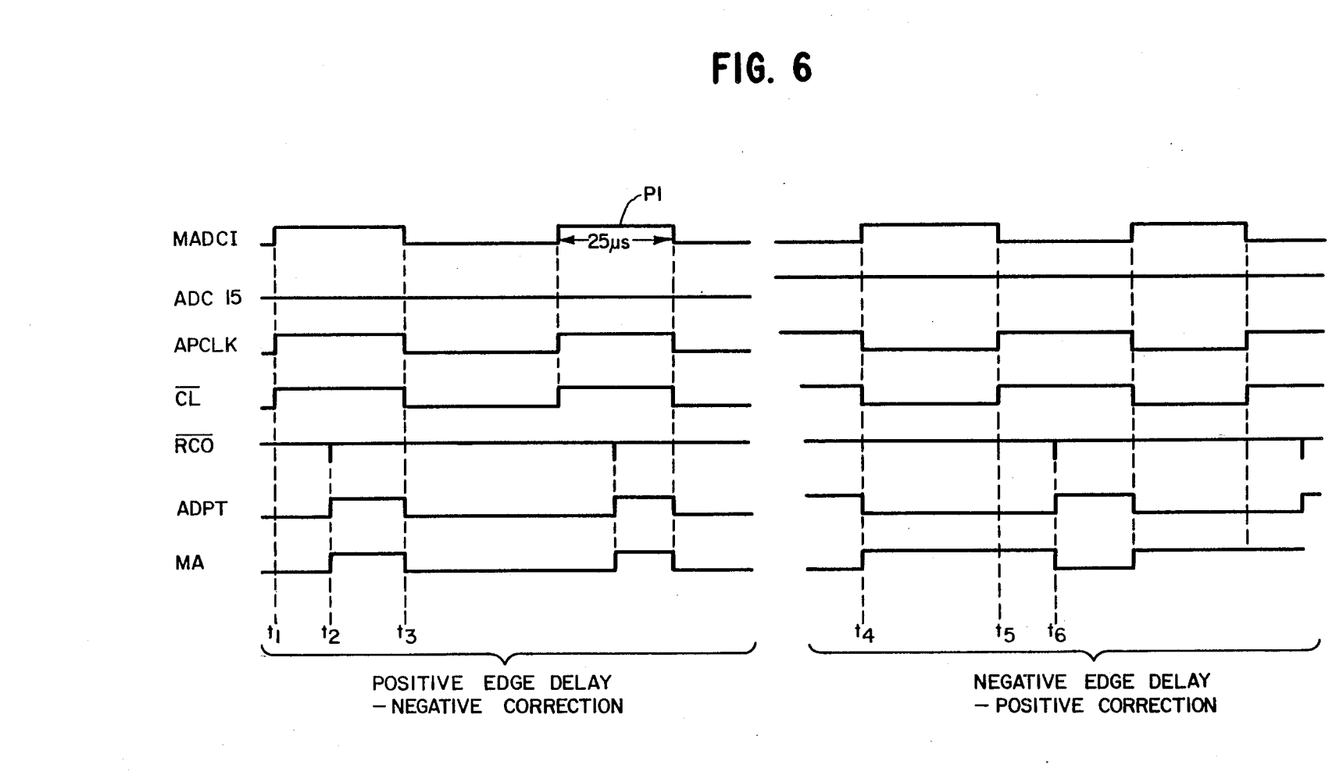
FIGS. 6-8 each comprises a set of waveform diagrams illustrating the operation of the circuits shown in FIGS. 4 and 5.
Figure 7:
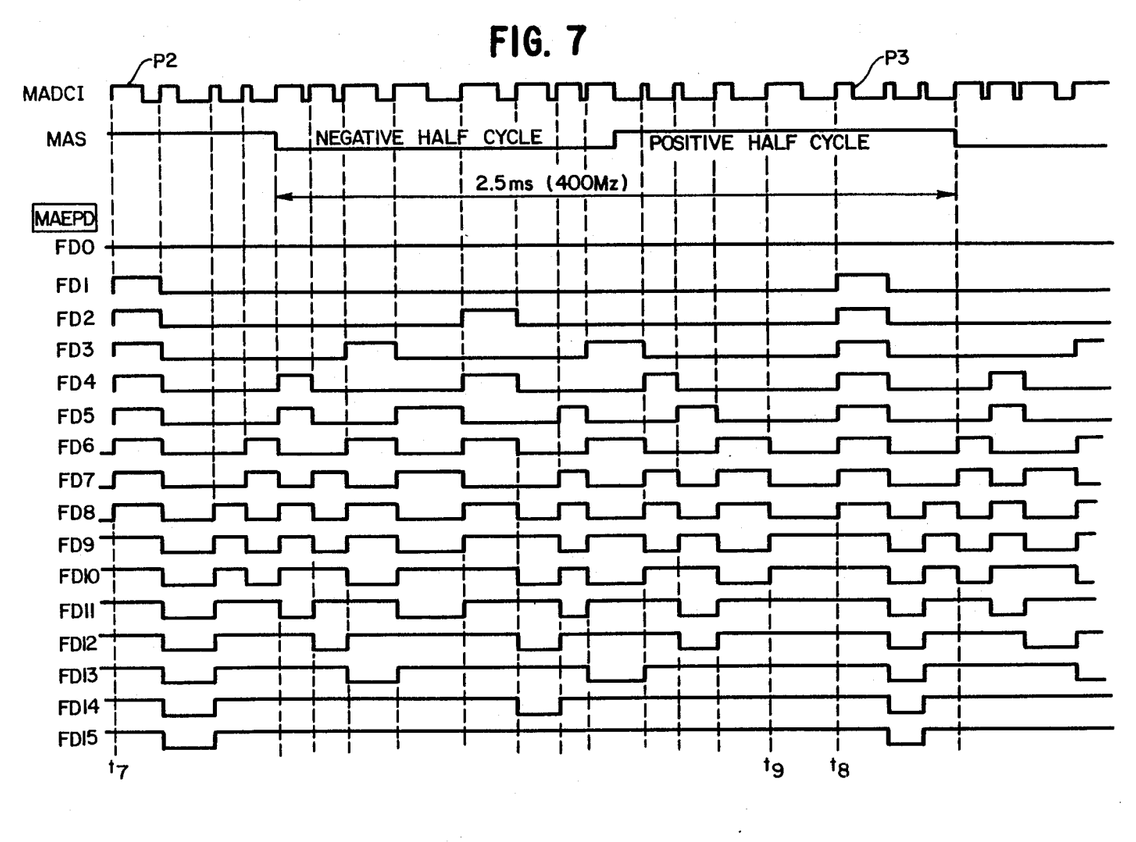
Figure 8:
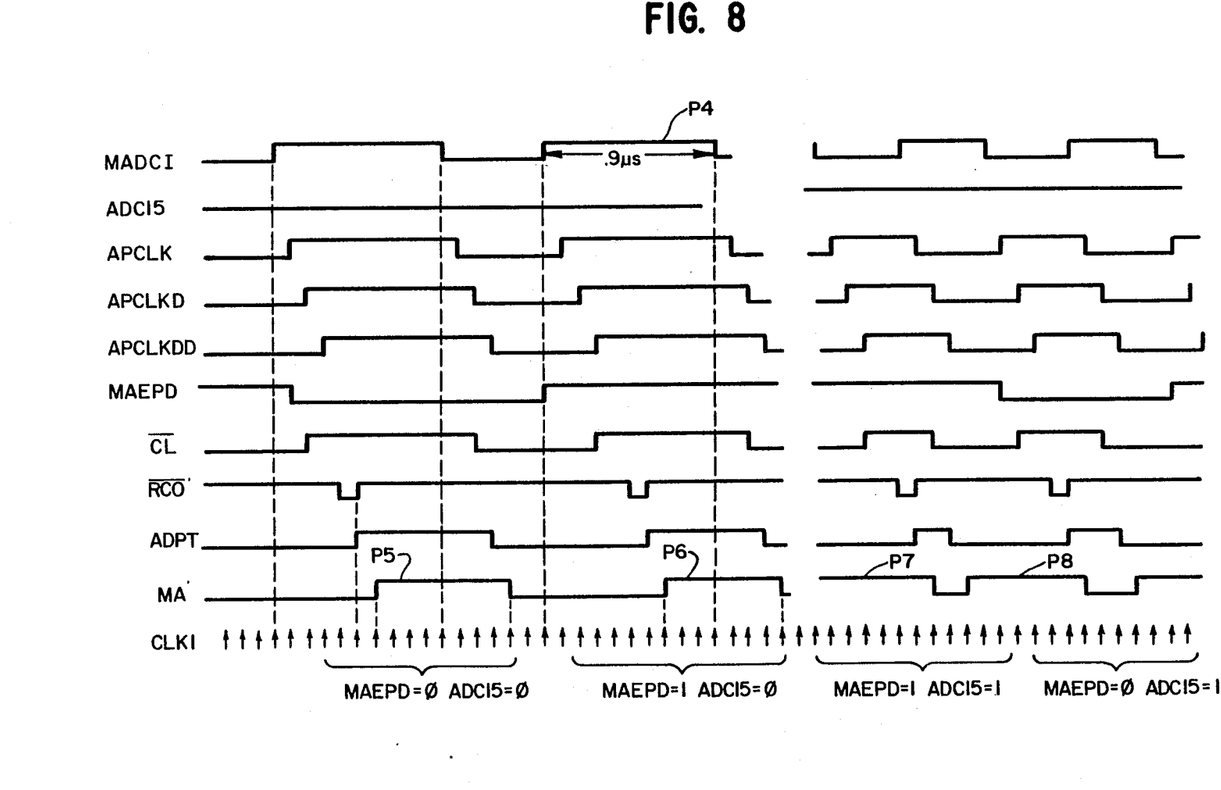

Referring now to FIG. 5, there is illustrated in greater detail the circuits shown in block diagram form in FIG. 4. The positions of the circuits in FIG. 5 have been altered slightly compared to FIG. 4 for clarity. Also, the circuits are shown for ease of understanding as being implemented in hardware which is responsive to and develops digital signals in the form of waveforms which can assume one of two states. Thus, for example, the digital bit stream obtained from the memories 50a–50c are represented in FIGS. 6–8 by the waveform MADCI. As noted above, however, some or all of the circuits of FIG. 5 may be implemented in software which is responsive to and develops digital signals in the form of digital words.

The bit stream signal MADCI, the rail to rail select signal RRSEL, the polarity bit ADC15 indicating the polarity of the DC content correction for the phase A inverter output and the half cycle waveform MAS are provided to a logic network 100 comprising an exclusive OR gate 102, AND gates 104, 106, 108 and 110, OR gate 112 and JK flip-flop 114. The logic circuit 100 develops a signal APOLI which is provided to one input of an exclusive OR gate 116. A further input of the exclusive OR gate 116 receives a delayed version MADCID of the signal MADCI as produced by a D flip-flop 118. The exclusive OR gate develops the signal APCLK which is provided to the counter control 70 and to the fractional delay state machine 60.

The fractional delay state machine 60 comprises a digital parallel summer 120 which sums the bits ADC0–ADC3 obtained from the gain and compensation unit 44a with the outputs of D flip-flops 122, 124, 126 and 128. The D flip-flops include clock inputs which receive the signal APCLK and further inputs which receive summation outputs SUM1, SUM2, SUM3 and SUM4 of the summer 120. The outputs of the D flip-flops are provided to summation inputs A1–A4. The parallel summer 120 includes a carry output at which the signal MAEPD is produced. This signal is provided together with signals APCLKD and APCLKDD produced by series connected D flip-flops 130, 132 to a logic circuit comprising AND gates 134, 136 and OR gate 138. The OR gate 138 develops the signal $\overline{CL}$ which is provided to a counter start input of the timer/counter 62. The signal $\overline{CL}$ is also provided together with the output RCO of the counter/timer 62 to an AND gate 140 having an output connected to one input of a JK flip-flop 142. A further, inverting input of the JK flip-flop 142 receives the signal APCLKD. The output of the JK flip-flop 142 and a signal APOLIDD developed by D flip-flops 144 and 146 is provided to an exclusive OR gate 148. The output of the exclusive OR gate 148 is provided to a D flip-flop 150 which in turn produces the control signal MA.

It should be noted that all of the JK and D flip-flops, with the exception of the D flip-flops 122–128, are clocked by the clock CLKl which operates at a frequency of approximately 9.8304 megahertz.

The operation of the circuit shown in FIG. 5 will now be described in conjunction with the waveform diagrams of FIGS. 6–8. FIG. 6 illustrates the coarse correction which is effected in accordance with the bits ADC4–ADC11 from the gain and compensation unit 44a. The scale of FIG. 6 is such that a pulse P1 of the signal MADCI obtained from the memory 50a is approximately 25 microseconds in duration. The scale of FIG. 6, together with the frequency of the clock CLK1, renders the differences between the signals APCLK, APCLKD and APCLKDD not discernible in the FIGURE and hence only the signal APCLK is shown. Also, the state of the signal MAEPD does not affect the control signal MA in a fashion which can be detected in FIG. 6 and hence this signal is not shown.

Assume that at a time t1 a rising edge of a pulse in the bit stream signal MADCI is received by the D flip-flop 118 and the AND gates 108 and 110 and that there is positive DC content in the inverter phase A output. Such a signal combination results in generation of a pulse rising edge in the signals APCLK, APCLKD and APCLKDD after short delays imposed by the D flip-flops 118, 130 and 132. Also at time t1, the signal $\overline{CL}$ rises to a high state. This high state signal starts the counter/timer 62 so that it decrements the value represented by the bits ADC4-ADCII to zero as clock pulses are received from the clock CLK1. Once this value has been decremented to zero at a time t2, a narrow pulse is produced in the counter/timer 62 output $\overline{RCO}$, in turn causing the signal ADPT produced by the JK flip-flop 142 to switch to a high state. This in turn causes the control signal output MA to also switch to a high state after a short delay imposed by the D flip-flop 150.

At time t3, the signal MADCI obtained from the memory 50a switches to a low state. This, coupled with the fact that the bit ADC15 indicates that there is positive DC content in the inverter output causes the signals APCLK, APCLKD and APCLKDD to similarly revert to a low state after the delays imposed by the flip-flops 118, 130 and 132. Once the signal APCLKD switches to a low state, the output of the AND gate 136 likewise switches to a low state, in turn causing the signal $\overline{CL}$, and hence the signals ADPT and MA, to also switch to a low state.

It can be seen that the control, in the presence of positive DC content in the inverter output, narrows each control signal pulse. This narrowing, caused by delay of the rising edge from time t1 to time t2, results in the coarse correction noted above.

Assume that negative DC content is present in the inverter output and that rising and falling pulse edges, respectively, in the signal MADCI are received by the input control circuit 64 at times t4 and t5. The signal APCLK, and hence the signals APCLKD and APCLKDD, switch from high to low states shortly after the time t4 and revert to the high state shortly after the time t5. The signal $\overline{CL}$ thus switches from a low to a high state substantially at the time t5, in turn causing the counter/timer 62 to decrement the word represented by the bits ADC4–ADC11 to zero. Once this decrementing is complete, a narrow pulse is produced at the output RCO at a time t6, in turn causing the signal ADPT to change to a high state. This has the effect of causing the control signal MA to switch to a low state shortly after the time t6.

It can be seen that the falling edge of each pulse in the MADCI signal is delayed from the time t5 until approximately the time t6, in turn resulting in increased positive DC content in the inverter output to counteract the negative DC content.

Referring now to FIG. 7, there is illustrated a typical signal MADCI received from the memory 50a for the rail to rail topology illustrated in FIG. 2 together with the half cycle reference signal MAS and possible waveform states for the signal for the case where positive DC content is present in the inverter output MAEPD. These states, designated FD0-FD15, in turn determine which pulses in each cycle of the inverter phase output have edges which are to be delayed by a time equal to the duration of a clock pulse produced by the clock CLK1. As seen in FIG. 7, each of the possible waveform states for the signal MAEPD, except the waveform FDO, comprises a series of pulses which include rising and falling edges coincident with rising edges of the pulses in the MADCI signal. If negative DC content were present in the inverter output, the rising and falling edges of the signal MAEPD would be coincident with falling edges of the pulses in the MADCI signal. As seen in the uppermost waveform, the number of pulses in each full cycle of the MADCI signal is equal to 15. However, each MAEPD waveform state FD1-FD15 repeats on a 16 pulse time base. Thus, each MAEPD waveform state will be in a high state at a different point in succeeding PWM cycles. For example, the FD1 waveform state for the signal MAEPD includes a pulse having a rising edge at a time t7 which is coincident with the rising edge of a pulse P2 in the positive half cycle of the MADCI signal. The pulse P2 happens to be the center pulse in a first positive half cycle of the MADCI waveform, although this need not be the case. The FD1 waveform state switches to a low state at the next rising edge in the MADCI signal and remains in a low state until a time t8, at which point the MAEPD signal again switches to a high state. This rising edge is coincident with a rising edge of a pulse P3 which is the next pulse after the center pulse in a second positive half cycle of the MADCI signal. Thus it can be seen that, over time, the pulses having a selected pulse edge delayed by a clock pulse will be evenly distributed over the cycle.

Although not visible in FIG. 7 due to the scale of the waveforms, the rising and falling edges of the pulses in the MAEPD state waveforms are actually displaced by the width of a pulse from the clock CLK1 relative to the rising edges of the MADCI signal pulses. Further, the state waveforms are shown for the case where positive DC content is present in the inverter output and hence negative correction is necessary. In the event that negative DC content is present in the inverter output, the rising and falling edges in the state waveforms for the MAEPD signal occur at times displaced by the width of a clock pulse from the clock CLK1 from the falling edges of the pulses in the MADCI signal.

It can be seen that the high state portion of the waveform state FD1 is coincident with a single pulse in a full cycle of the inverter output, for example the pulse beginning at the time t7. Likewise, waveform states FD1-FD10 are in the high state at times coincident with 2-10 of the pulses in the MADCI signal, respectively, between the time t7 and a time t8. However, state waveforms FD11-FD15 are in a high state for 10-14 of the pulses, respectively, in the MADCI signal between these times.

FIG. 8 comprises a series of waveform diagrams illustrating the effect of the MAEPD signal for the example where such signal is in the FD8 state. The waveforms of FIG. 8 are drawn to a scale such that a pulse P4 in the PWM pulse pattern obtained from the memory 50a is 0.9 microseconds wide.

In the time scale of FIG. 8, the delays imposed by the D flip-flops 118, 130 and 132 are evident so that the signals MADCI, APCLK, APCLKD and APCLKDD can be distinguished. Also assumed in the waveforms of FIG. 8 is that the correction represented by the bits ADC4-ADC11 is such that a coarse correction delay of two clock pulses is imposed on the leading edge of a pulse P5 in the MA waveform. During the time that the pulse P5 is being developed, the MAEPD signal is in a low state, thus resulting in no additional delay other than the two clock pulse delay imposed by the counter/timer 62. However, during generation of a pulse P6, the signal MAEPD is in a high state. Hence, the two clock pulse delay imposed by the counter/timer 62 is increased by an additional clock pulse delay so that the width of the pulse P6 is further reduced due to delay of its leading edge by three clock pulses.

Pulses P7 and P8 illustrate the condition wherein negative DC content is present in the inverter output, and hence the falling edges of the PWM waveforms are delayed. A pulse P7 is developed in the signal MA which has a pulse width which is greater than the pulse width of the corresponding pulse in the MADCI waveform by three clock pulses. These three additional clock pulses are due to the coarse two clock pulse delay imposed by the counter/timer 62 and the single clock pulse delay resulting from the signal MAEPD being in a high state. A next pulse P8 in the MA output signal is wider than the corresponding pulse in the MADCI signal by two clock pulses since the MAEPD signal is in a low state.

While only the edge select and edge delay circuits 46a and 48a for the inverter phase A output have been described, it should be understood that the other edge select and edge delay circuits 46a, 46b and 48a, 48b are identical thereto and operate similarly.

From the foregoing, it can be seen that DC content in the inverter output is reduced and can be substantially eliminated using the control of the present invention.

It should be noted that the control of FIG. 4 can be modified in a straightforward fashion to prevent the control from modifying the pulses and notches in the PWM waveform beyond limits imposed by the response times of the switches of the inverter. Thus, for example, the control can be modified to prevent the pulses or notches from becoming too narrow which might lead to a fault condition. Such a modification could be implemented by a design which is readily apparent to one skilled in the art.

We claim:

1. A control for an inverter having a switch which is operated in accordance with a waveform having spaced rising and falling edges, comprising:
    means for detecting the magnitude of a DC component in the inverter AC output power; and
    means responsive to the detecting means for adjusting the time of selected rising or falling edges to reduce the magnitude of the DC component.

2. The control of claim 1, further including means for detecting whether the DC component is positive or negative in polarity and wherein the adjusting means includes means for delaying selected rising or falling edges in dependence upon whether the DC component is positive or negative in polarity.

3. The control of claim 1, further including means for detecting whether the DC component is positive or negative in polarity and wherein the adjusting means includes means for delaying selected rising edges if the DC content is positive in polarity and for delaying selected falling edges if the DC content is negative in polarity.

4. The control of claim 1, wherein the adjusting means includes an edge select circuit coupled to the detecting means and an edge delay circuit coupled to the detecting means and to the edge select circuit wherein the edge delay circuit delays selected rising or falling edges by amounts determined in dependence upon the magnitude of the DC component.

5. The control of claim 4, wherein the detecting means includes means for developing a series of digital correction words each representing the amount of time by which a selected edge is to be delayed and wherein the edge select circuit includes a digital timer/counter which receives the series of correction words and a clock signal, the timer/counter delaying each selected edge by an amount of time required to count each correction word in accordance with the clock signal inputs thereof and which include program inputs coupled to the detecting means and wherein the control further includes a clock coupled to clock inputs of the counter, a polarity detector which develops a digital signal indicating whether the DC component is positive or negative in polarity.

6. A control for a pulse width modulated (PWM) inverter which develops N passes outputs each produced by a pair of switches which are alternately operated in accordance with a PWM waveform stored in a memory and having rising and falling edges comprising:
 a control signal generator for each phase output including a low pass filter coupled to the phase output which develops a signal representing the magnitude and polarity of a DC component in the phase output;
 an edge select circuit coupled to the low pass filter for selecting edges of the PWM waveform to be delayed in dependence upon the polarity of the DC component; and
 an edge delay circuit coupled to the memory, the low pass filter and the edge select circuit for delaying the selected edges of the PWM waveform by amounts which depend upon the magnitude of the DC component in the phase output to produce a control signal for controlling the switches.

7. The control of claim 6, wherein the edge delay circuit includes a programmable counter which receives the waveform and which include program inputs coupled to the low pass filter and wherein the control further includes a block coupled to clock inputs of the counter, a polarity detector which develops a digital signal indicating whether the DC component is positive or negative in polarity wherein the digital signal is provided to the counter.

* * * * *

REEXAMINATION CERTIFICATE (1472nd)

United States Patent
Roe et al.

[11] B1 4,882,120
[45] Certificate Issued May 21, 1991

[54] DC CONTENT CONTROL FOR AN INVERTER

[75] Inventors: Derrick I. Roe, Rockford, Ill.; Christopher J. Rozman, Delavan, Wis.; Bradley J. Recker, Rockford, Ill.

[73] Assignee: Sunstrand Corporation

Reexamination Request:
No. 90/001,992, Apr. 11, 1990

Reexamination Certificate for:
Patent No.: 4,882,120
Issued: Nov. 21, 1989
Appl. No.: 285,119
Filed: Dec. 16, 1988

[51] Int. Cl.⁵ .................. H02P 13/18; H02M 5/458
[52] U.S. Cl. .................................. 363/98; 363/37; 363/41
[58] Field of Search .................. 363/37, 41, 97, 98, 363/131, 132

[56] References Cited

U.S. PATENT DOCUMENTS

| | | | |
|---|---|---|---|
| 4,370,702 | 1/1983 | Shuey et al. | 363/42 |
| 4,617,622 | 10/1986 | Fox | 363/98 |
| 4,621,316 | 11/1986 | Uesugi | 363/98 |
| 4,635,177 | 1/1987 | Shekhawat et al. | 363/41 |
| 4,729,082 | 3/1988 | Sato | 363/41 |

*Primary Examiner*—Peter S. Wong

[57] ABSTRACT

Power inverters for converting DC power into AC power often produce a DC component in the inverter output which is objectionable. In order to overcome this problem, an inverter control according to the present invention detects the magnitude of the DC component in the inverter AC output power and adjusts the time of selected rising and falling edges of control waveforms for switches in the inverter to reduce the magnitude of the DC component.

FIG. 3

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 6 and 7 is confirmed.

Claims 1, 3 and 5 are determined to be patentable as amended.

Claims 2 and 4, dependent on an amended claim, are determined to be patentable.

1. A control for an inverter having a switch which is operated in accordance with a waveform having spaced rising and falling edges, comprising:
   means for detecting the magnitude of a DC component in the inverter AC output power; and
   means responsive to the detecting means for adjusting the time of selected rising or falling edges *in an amount dependent upon the magnitude of the DC component* to reduce the magnitude of the DC component.

3. [The] *A* control [of claim 1, further including] *for an inverter having a switch which is operated in accordance with a waveform having spaced rising and falling edges, comprising:*
   *means for detecting the magnitude of a DC component in the inverter AC output power;*
   means for detecting whether the DC component is positive or negative in polarity; and
   *means responsive to the detecting means for adjusting the time of selected rising or falling edges to reduce the magnitude of the DC component* wherein the adjusting means includes means for delaying selected rising edges if the DC [content] *component* is positive in polarity and for delaying selected falling edges if the DC [content] *component* is negative in polarity.

5. The control of claim 4, wherein the detecting means includes means for developing a series of digital correction words each representing the amount of time by which a selected edge is to be delayed and wherein the edge select circuit includes a digital timer/counter which receives the series of correction words and a clock signal, the timer/counter delaying each selected edge by an amount of time required to count each correction word in accordance with the clock signal inputs thereof and [which include] *including* program inputs coupled to the detecting means and wherein the control further includes a clock coupled to clock inputs of the counter [,] *and* a polarity detector which develops a digital signal indicating whether the DC component is positive or negative [in polarity].

* * * * *